United States Patent
Kusase et al.

(10) Patent No.: US 6,903,477 B2
(45) Date of Patent: Jun. 7, 2005

(54) INDUCTION MACHINE WITH MOTOR AND GENERATOR OPERATION MODES

(75) Inventors: Shin Kusase, Obu (JP); Tsutomu Shiga, Nukata-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/323,730

(22) Filed: Dec. 20, 2002

(65) Prior Publication Data

US 2003/0127931 A1 Jul. 10, 2003

(30) Foreign Application Priority Data

Dec. 25, 2001 (JP) ........................................ 2001-392246

(51) Int. Cl.⁷ ............................................... H02K 3/00
(52) U.S. Cl. ...................... 310/180; 310/184; 310/166; 310/171; 310/168; 322/89; 322/91; 322/90; 318/379
(58) Field of Search ................................ 310/180, 184, 310/166, 171, 168, 183; 322/46, 59, 89, 20; 318/379–380

(56) References Cited

U.S. PATENT DOCUMENTS

| | | | | |
|---|---|---|---|---|
| 5,376,851 A | * | 12/1994 | Lipo et al. | 310/179 |
| 5,459,385 A | * | 10/1995 | Lipo et al. | 310/184 |
| 5,723,973 A | * | 3/1998 | Umeda et al. | 322/20 |
| 5,825,113 A | * | 10/1998 | Lipo et al. | 310/181 |
| 5,866,964 A | * | 2/1999 | Li | 310/198 |
| 6,008,561 A | * | 12/1999 | Tang | 310/183 |
| 6,384,564 B1 | * | 5/2002 | Pollock | 318/254 |
| 6,462,506 B2 | * | 10/2002 | Cochoy et al. | 318/801 |
| 6,522,043 B2 | * | 2/2003 | Masegi | 310/180 |
| 6,646,406 B1 | * | 11/2003 | Pollock et al. | 318/254 |
| 6,653,811 B2 | * | 11/2003 | Branecky | 318/254 |

* cited by examiner

*Primary Examiner*—Karl Tamai
*Assistant Examiner*—Yahveh Comas
(74) *Attorney, Agent, or Firm*—Posz Law Group, PLC

(57) ABSTRACT

An electric machine selectively operates as a generator mode or a motor mode. The electric machine includes a stator core, a multi-phase armature winding, a field coil, a moving core having a plurality of salient poles so as to move relative to the stator core to cross the magnetic field. Field current is supplied to the field coil differently according to operation mode. A portion of the armature winding is short-circuited to form an additional magnetic field that has a phase different from the magnetic field of the field coil. Therefore, the rotary core moves relative to the stator core when the operation mode is in the motor mode.

8 Claims, 3 Drawing Sheets

INDUCTION MACHINE WITH MOTOR AND GENERATOR OPERATION MODES

CROSS REFERENCE TO RELATED APPLICATION

The present application is based on and claims priority from Japanese Patent Application 2001-392246, filed Dec. 25, 2001, the contents of which are incorporated herein by reference.

BACKGROUND OF THE INVENTION

1. Field of the Invention

The present invention relates to a rotary electric machine and, particularly, a generator-motor.

2. Description of the Related Art

A dc electric rotary machine has been used as a generator-motor for a long time. Because such a dc motor has brushes, the lifetime is limited. Although an ac rotary electric machine with a two-way power converter or an inverter has been used as the generator-motor recently, the inverter necessitates many power transistors of a large capacity to control a large amount of multi-phase current, resulting in an expensive motor-generator having a complicated structure.

SUMMARY OF THE INVENTION

Therefore, the present invention has been made in view of the above problems.

A main object of the invention is to provide an inexpensive and powerful electric rotary machine.

Another object of the invention is to provide a generator-motor in which rotating magnetic field is formed by short-circuiting a portion of an armature winding.

According to a feature of the invention, an electric machine includes a stator having an armature winding, a magnetic field source for supplying magnetic field to the stator, and a moving core disposed opposite the stator so as to move relative to the stator to cross the magnetic field. The electric machine generates electric power when the moving core moves relative to the stator and cyclically changes the magnetic field to generate mechanical power.

According to another feature of the invention an electric machine operating as one of a generator mode and a motor mode includes a stator core having a plurality of teeth and slots, a multi-phase armature winding, a field coil mounted in the stator core to form main magnetic field, a moving core having a plurality of salient poles so as to move relative to the stator core to cross the main magnetic field, a first controller for supplying field current to the field coil according to operation mode and second controller for short-circuiting a portion of the armature winding to form an additional magnetic field having a phase different from the main magnetic field thereby moving the rotary core relative to the stator core when the operation mode is in the motor mode. The motor operation can be controlled by controlling the field coil and timing of the second controller. Therefore, a complicated and expensive inverter is not necessary to control the motor operation.

Preferably, the stator core of the electric machine is generally cylindrical, and the moving core is disposed inside the stator core. In addition, the stator core may have a plurality of phase coils respectively wound around the teeth, and the second controller means short-circuits two of the phase coils disposed adjacent to each other.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A preferred embodiment of the invention is described with reference to the appended drawings.

Figure 1:
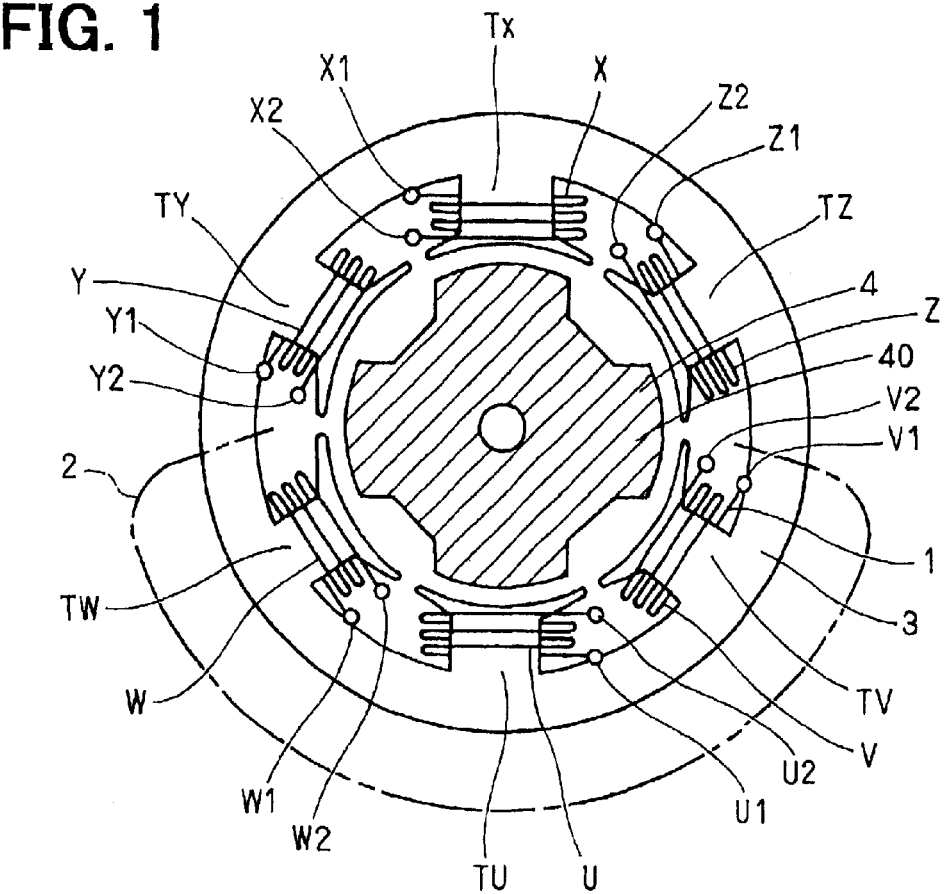
FIG. 1 is a schematic diagram illustrating a rotary electric machine according to a preferred embodiment of the invention.
Figure 2:
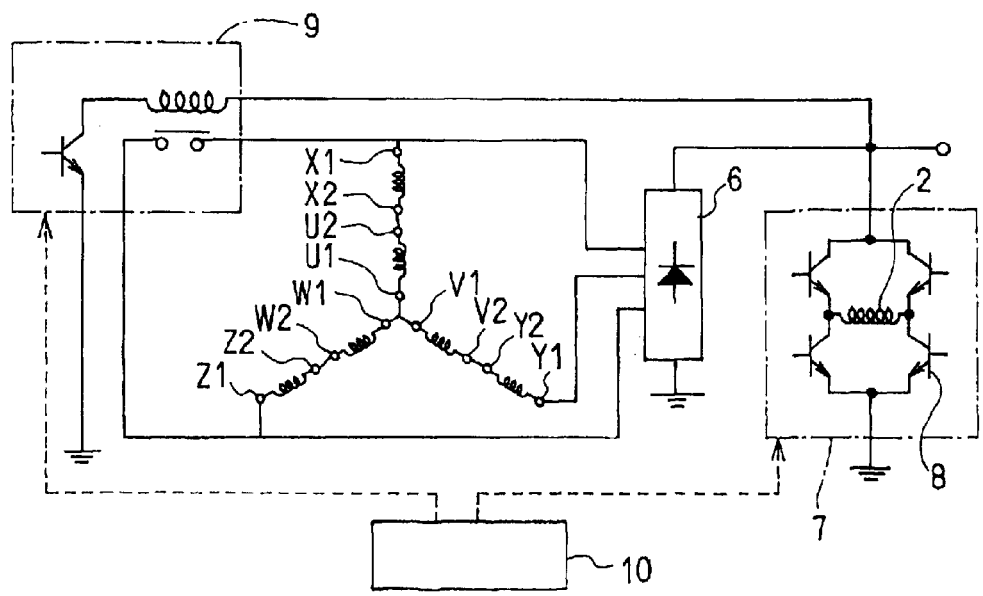
FIG. 2 is a circuit diagram of an electric circuit including the rotary electric machine shown in FIG. 1.

A rotary electric machine comprises a three-phase start connected armature winding 1 having six phase coils X, Y, Z, U, V, and W, a field coil 2, a stator core 3 having six teeth TX, TY, TZ, TU, and TW and a magnetic inductor rotor 4 having four salient poles 40. The phase coil X has terminals X1 and X2, the phase coil Y has terminals Y1, and Y2, the phase coil X has terminals Z1 and Z2, the phase coil U has terminals U1 and U2, the phase coil V has terminals V1 and V2, and the phase coil W has terminals W1 and W2. Each phase coil has 7 turns and is connected in series to another that is 180° in electric angle different therefrom to form one three phase-windings of a three-phase star-connected armature winding having three output terminals, as shown in FIG. 2. The output terminals are connected to a full-wave three-phase rectifier unit 6. The field coil 2 has 200 turns and accommodated in two slots that are 180 in electric angle different from each other or are symmetrical about the center of the stator core 3. That is, the field coil 2 is disposed in the slot between the teeth TY and TW and the slot between the teeth TZ and TV. The field coil 2 is connected to a regulator that-has having H-bridge circuit of switching transistors 8 so that the field coil can be excited in two ways or opposite polarities. A short-circuit switch 9 is connected between the terminal X1 of the phase coil X and the terminal Z1 of the phase coil Z.

The stator core 3 and the inductor rotor 4 are made of laminated magnetic iron sheets. However, it is possible to employ a stator core or a inductor rotor made of magnetic powder.

The short-circuit switch 9 and the switching transistors 8 of the regulator 7 are controlled by a field current control circuit 10. The number of the salient poles 40 of the inductor rotor 4 can be changed from four to two or another number.

Figure 3:
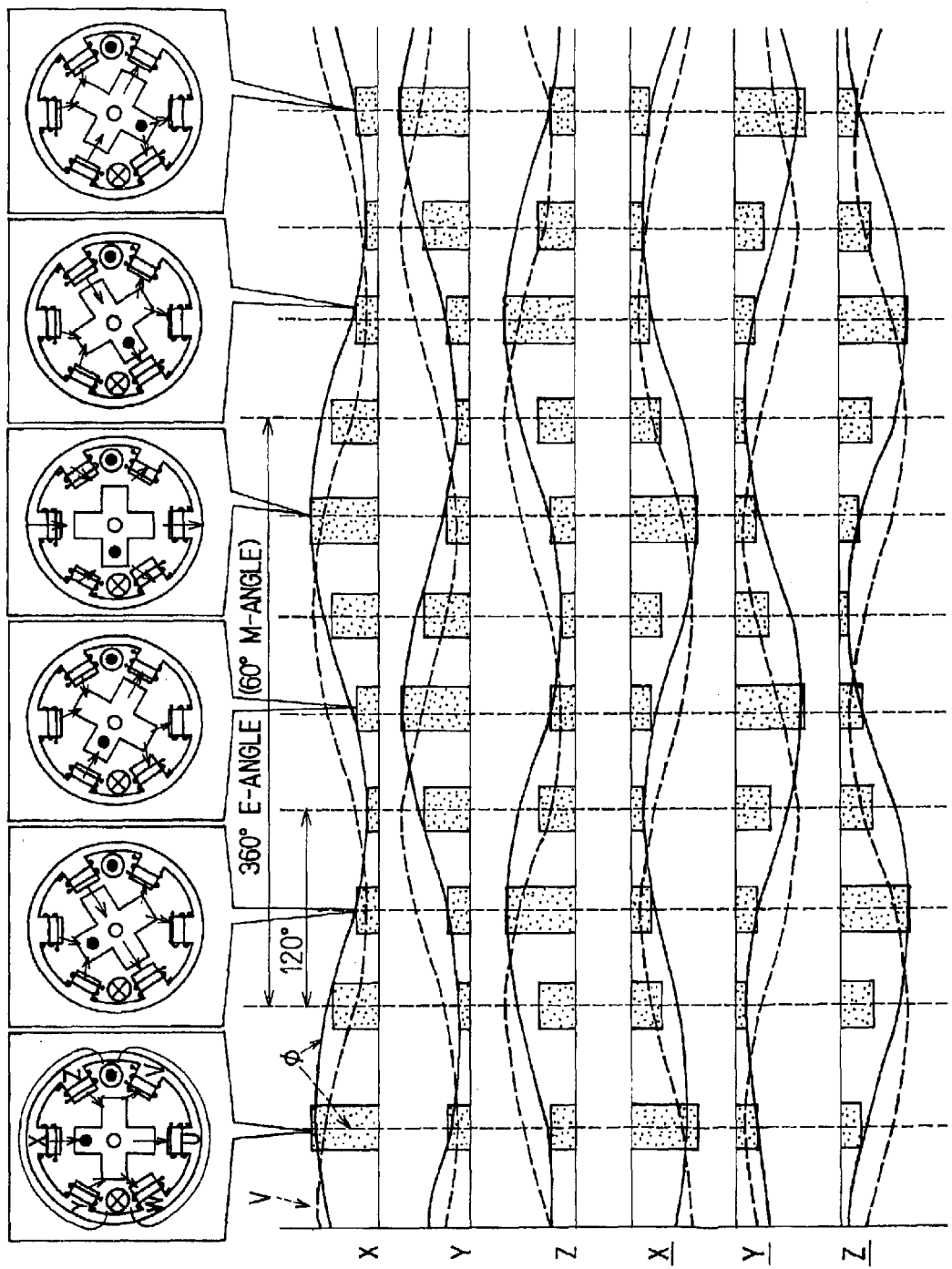
FIG. 3 is a timing diagram illustrating operation of the rotary electric machine shown in FIG. 1.
Figure 4:
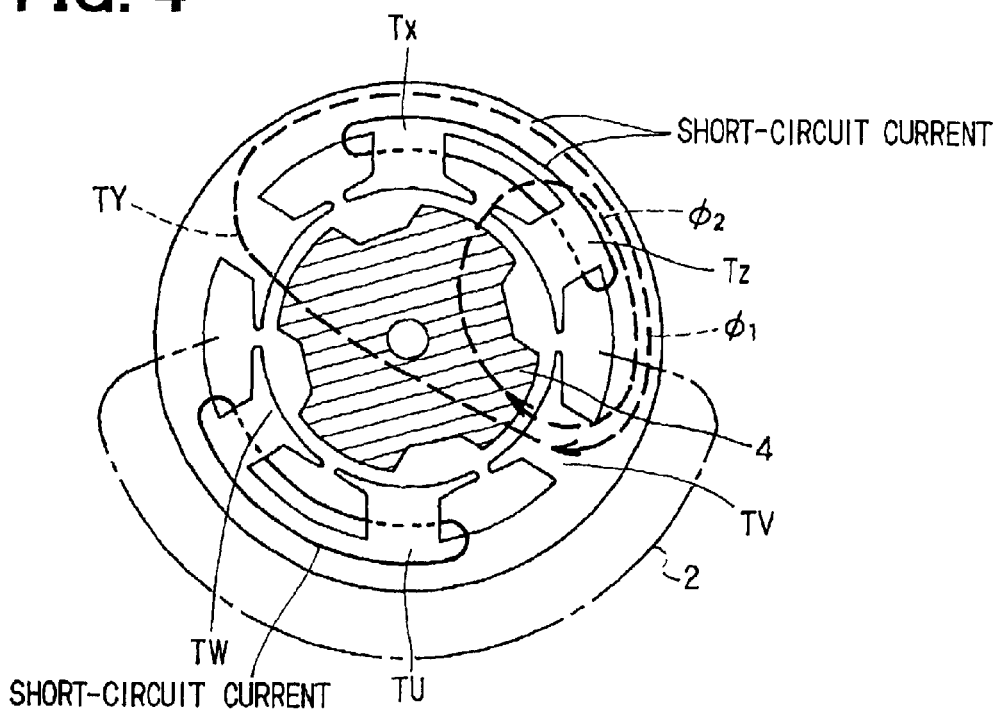
FIG. 4 is a schematic diagram illustrating flow of magnetic flux of the rotary electric machine shown in FIG. 1 when it operates as a motor.

When the inductor rotor 4 rotates with the field coil 2 being excited by the regulator 7 in one direction, magnetic flux crosses respective phase coils X, Y, Z, U, V and W, as shown in FIG. 3. As a result, voltage is induced in the respective phase coils, as indicated by dotted lines. This voltage is converted to output dc voltage by the rectifier unit 6. A portion of the output dc voltage is supplied to the field coil through the switching transistors 8. However, the field coil 2 can be excited by an outside electric power source.

When the field current control circuit 10 sends a motor control signal to the switching transistors of the regulator 7, field current If is alternately supplied to the field coil in two ways. The field current control circuit 10 also sends a control signal to the short-circuit switch 9 to connect or short-circuit the terminals X1 and Z1. Consequently, the field coil 2 generates alternating magneto-motive force to form magnetic flux Φ1, which crosses the phase coil Y that is not short-circuited.

Figure 5:
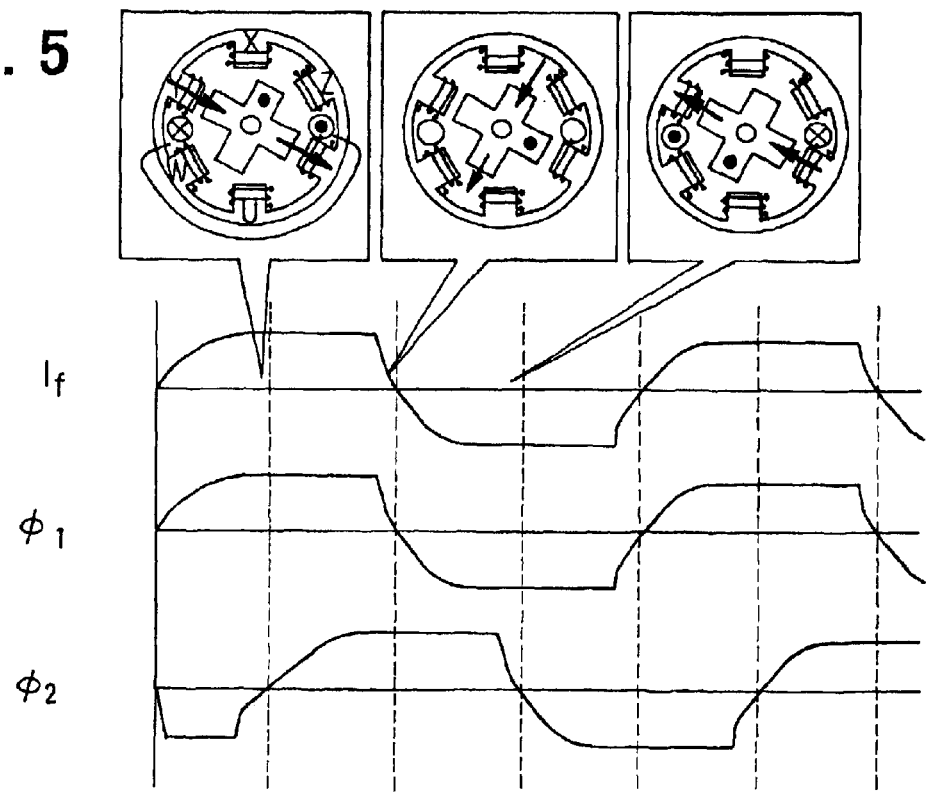
FIG. 5 is a graph showing relationship between field current and magnetic flux.

When the phase coils X and Z are short-circuited, flux Φ2 is generated 90° in electric angle after flux Φ1 by the phase coils X and Z like a shading coil or a short-circuit coil of an induction motor, so that a rotating magnetic field is formed as indicated by arrows in FIG. 5. Accordingly, the inductor rotor 4, which has four salient poles 40, is rotated by the rotating magnetic field. The field current can be reduced if the number of turns is increased, so that the capacity of the switching transistors 8 can be made smaller.

Instead of short-circuiting some of the phase coils to generate flux Φ2, it is possible to apply a suitable voltage to those of the phase coils to form a rotating magnetic field. The inductor rotor can be substituted by a rotor having a secondary coils or permanent magnets, as far as it can operate under magnetic field. The above structure can be also applied to a linear type electric machine.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An electric machine for generator and motor operation comprising:
    a stator having an armature winding;
    a magnetic field coil for supplying magnetic field to said stator;
    a moving core disposed opposite said stator so as to move relative to said stator to cross said magnetic field;
    field coil exciting means for exciting said magnetic field coil in one direction during the generator operation and alternately exciting in opposite directions during the motor operation;
    first means for outputting electric power generated in said armature winding during the generator operation; and
    second means for cyclically changing a connection associated with said armature winding to form a rotating magnetic field to generate mechanical power during the motor operation.

2. The electric machine as claimed in claim 1, where:
    said stator comprises a stator core having a plurality of teeth and slots;
    said armature winding comprises a multi-phase armature winding having a plurality of phase-windings respectively wound around said teeth; and
    said moving core has a plurality of salient poles.

3. The electric machine as claimed in claim 1, wherein said stator core is generally cylindrical, and said moving core is disposed inside said stator core.

4. The electric machine as claimed in claim 3, wherein:
    said second means short-circuits two of said phase-windings disposed adjacent to each other.

5. The electric machine as claimed in claim 3, wherein:
    said armature winding comprises three star-connected phase-windings.

6. The electric machine as claimed in claim 5, wherein:
    each of said three star connected phase-windings has two phase coils disposed 180° in electric angle different from the other;
    said stator core has six salient poles extending radially inward at equal intervals around which said phase coils are respectively wound; and
    said magnetic field coil is disposed in slots disposed symmetrical about a center of said stator core.

7. An electric mahine for selectively operating in one of two operating modes including: a generator mode and a motor mode, said electric machine comprising:
    a stator core having a plurality of teeth and slots;
    a multi-phase armature winding;
    a field coil mounted in said stator core to form main magnetic field; a moving relative to said stator core to cross said magnetic field;
    first means for supplying a field current to said field coil in one direction when the generator mode is selected and alternately in two opposite directions when the motor mode is selected; and
    second means for short-circuiting a portion of said armature winding to form an additional magnetic field having a phase different from said main magnetic field thereby moving said rotary core relative to said stator core when the one of two operating modes includes the motor mode.

8. An electric machine for selectively operating in one of two operating modes including a generator mode and a motor mode, said electric machine comprising:
    a stator having: an armature winding including a plurality of phase-windings evenly mounted in a circumferential direction, a magnetic field space, and a field coil mounted at prescribed portions of the stators to supply magnetic field to said magnetic field space;
    a moving core disposed in said magnetic field space opposite said stator so as to move relative to said stator to cross said magnetic field;
    field coil exciting means for exciting said field coil in one direction when the generator mode is selected and alternately in opposite directions when the motor mode is selected;
    first means for outputting electric power generated in said armature winding when said moving core moves relative to said stator and and the generator mode is selected; and
    second means for cyclically changing a connection associated with said phase windings to form a rotating magnetic field to generate mechancial power when the motor mode is selected.

* * * * *